United States Patent [19] [11] 3,757,050
Mizote [45] Sept. 4, 1973

[54] MULTICHANNEL TRANSMISSION SYSTEM USING CLOCK PULSES EACH OCCURRING WITHIN A DEFINITE TIME POSITION

[75] Inventor: Masanori Mizote, Yokohama, Japan

[73] Assignee: Nissan Motor Company, Limited, Kanagawa-ku, Yokohama City, Japan

[22] Filed: Dec. 1, 1971

[21] Appl. No.: 203,598

[30] Foreign Application Priority Data

Apr. 21, 1971 Japan .......... 46/25929
May 29, 1971 Japan .......... 46/37369

[52] U.S. Cl. .......... 179/15 AL
[51] Int. Cl. .......... H04j 3/08
[58] Field of Search .......... 179/15 A, 15 BM, 179/15 BY, 15 AL; 340/201 R

[56] References Cited

UNITED STATES PATENTS 2,406,165 8/1946 Schroeder .......... 179/15 AL
3,651,454 3/1972 Venema .......... 340/201 R
3,680,056 7/1972 Kropfl .......... 179/15 AL

*Primary Examiner*—Ralph D. Blakeslee
*Attorney*—John Lezdey

[57] ABSTRACT

A multichannel transmission system comprising a generator for supplying to all the transmitters and receivers with a reference signal consisting of a plurality of clock pulse combined with a periodic sequential pulse signal. Each transmitter produces amplitude-modulated carrier pulses each occurring within a time position defined by the clock pulses in accordance with a given information signal to be conveyed. Each receiver opens its gate the same time position as the associated transmitter so as to receive and demodulate the carrier pulses from the transmitter.

5 Claims, 9 Drawing Figures

INVENTOR
MASANORI MIZOTE
BY
John Lezdey
ATTORNEY

INVENTOR
MASANORI MIZOTE
BY John [signature]
ATTORNEY

INVENTOR
MASANORI MIZOTE
BY John Lezdey
ATTORNEY

INVENTOR
MASANORI MIZOTE
BY John Lezdey
ATTORNEY

| | (6) | (7) | 1 | 2 | 3 | 4 | 5 | 6 | 7 | (1) |
|---|---|---|---|---|---|---|---|---|---|---|
| $D_1$ | 1 | 1 | 1 | 0 | 0 | 1 | 0 | 1 | 1 | 1 |
| $D_2$ | 0 | 1 | 1 | 1 | 0 | 0 | 1 | 0 | 1 | 1 |
| $D_3$ | 1 | 0 | 1 | 1 | 1 | 0 | 0 | 1 | 0 | 1 |
| X | 0 | 1 | 0 | 0 | 0 | 0 | 0 | 0 | 1 | 0 |

INVENTOR
MASANORI MIZOTE
BY John Lezdey
ATTORNEY

MULTICHANNEL TRANSMISSION SYSTEM USING CLOCK PULSES EACH OCCURRING WITHIN A DEFINITE TIME POSITION

This invention relates to multichannel communication systems and more particularly to a time division multichannel transmission system for producing, transmitting and receiving pulse signals which are respectively assigned to signal channels and modulated for information conveyance.

In an industrial machinery or a motor vehicle, it is important that a various signals be transmitted from one or more sources to one or more terminal control units. For this purpose, the sources are usually connected to the terminal control units by means of a number of individual full lines, resulting in an increased production cost and large-sized construction of the system as a whole. Thus, it is preferable to apply a multichannel transmission system to the transmission of the numerous signals by means of a small number of full lines. Various multichannel transmission systems such as have heretofore been devised including the frequency division and time division multiplexing system, which systems, are, however, not fully acceptable because of its costly and complicating construction.

It is therefore an object of the present invention to provide a simple and economical time division multichannel transmission system.

Another object is to provide a time division multichannel transmission system which is substantially free from external disturbances.

Another object is to provide a time division multichannel transmission system which is specifically suitable for the transmission of ON-OFF signals.

In the multichannel transmission system according to the present invention, a repeatable pulse sequence is used as a reference signal. One preferred form of the repeatable pulse sequence consists of a certain number of sequential clock pulses the first of which is an indexing pulse having a larger amplitude than the remaining. Another form of the repeatable pulse sequence consists of a certain number of sequential clock pulse which are modulated by a periodic sequential signal such as, a *maximum length linear shift-register sequence signal* (abbreviated to M-sequence signal). The repeatable pulse sequence is applied to all the transmitters and the receivers through a common bus line. Each of the transmitters repeatedly produces a carrier pulse appearing within a time position defined one of the clock pulses and representing a distinct signal channel assigned to the particular transmitter. The carrier pulse is then modulated, for example, in amplitude by an information signal to be transmitted to the associated receiver. The carrier pulses delivered from all the transmitters are supplied to a transmission bus line. In this instance, the carrier pulses allocated to different transmitters do not superpose on one another. Each of the receivers, on the other hand, repeatedly produces, in the same manner as the transmitters, a gate pulse appearing within a time position representing the same signal channel that is assigned to the associated transmitter. Each receiver operates to receive the modulated carrier pulse from the transmission line during the time duration of the gate pulse and then demodulates the carrier pulse so as to obtain the information signal.

Figures 1, 3:
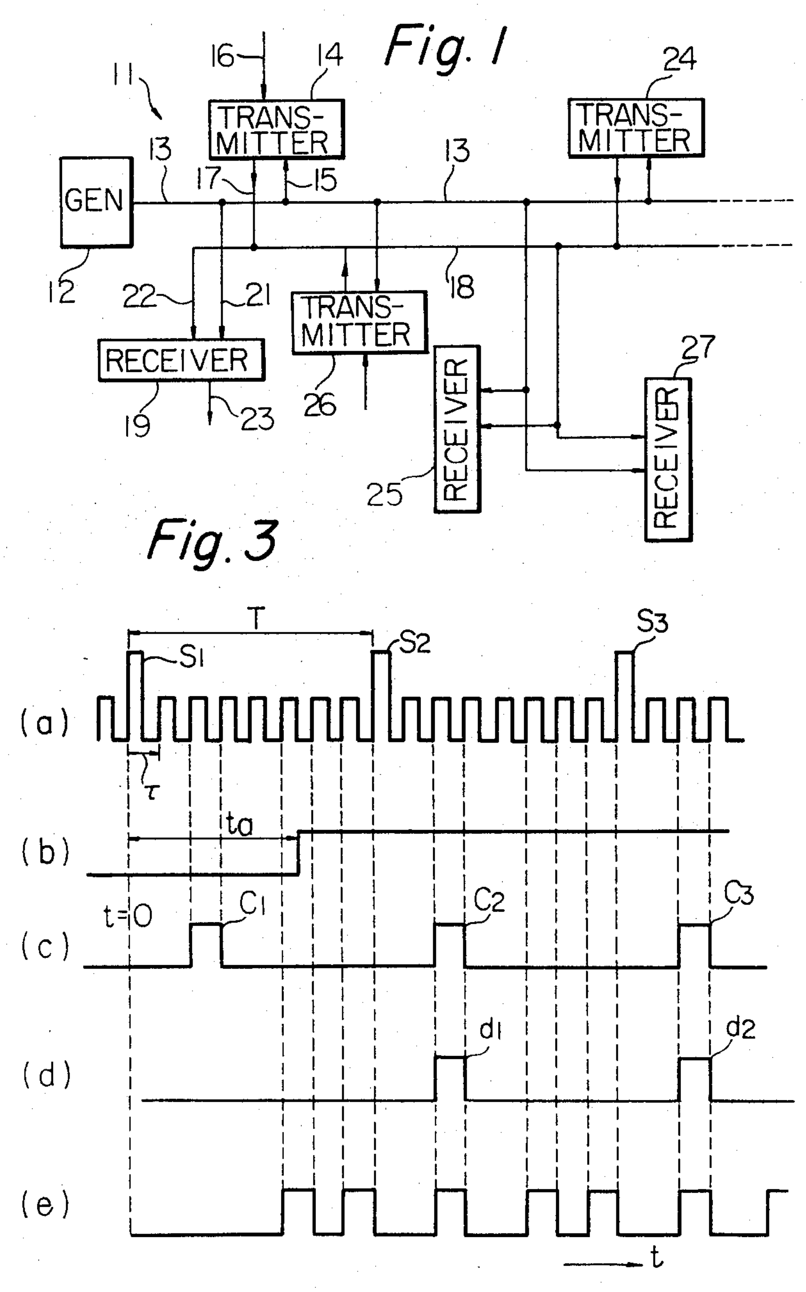
FIG. 1 is a schematic block diagram of the multichannel transmission system according to the present invention.
FIG. 3 illustrates different wave-forms in the transmission system using the transmitter and the receiver of FIG. 2.

Referring specifically to FIG. 1, a time division multichannel transmission system 11 according to the present invention comprises a generator 12 which is adapted to produce a reference signal which consists of a plurality of repeatable pulse sequence on a reference signal bus line 13. A transmitter 14 has an input terminal 15 connected to the reference signal bus line 13 through which the reference signal is delivered. An information signal to be conveyed is applied to the transmitter 14 through another input terminal 16. The transmitter 14 then produces carrier pulses carrying the information signal on its output terminal 17 which is connected to a transmission bus line 18. Each of the carrier pulses appears at a time position representing a signal channel allotted to the transmitter 14. A receiver 19 is associated with the transmitter 14 and has an input terminal 21 connected to the reference signal bus line 13 and another input terminal 22 connected to the transmission bus line 18. The receiver 19 receives the reference signal through the input terminal 21 and then produces gate pulses each appearing within the same time position as the carrier pulse produced by the transmitter 14. The receiver 19 opens its gate during the pulse duration of the gate pulse so as to receive the carrier pulse delivered from the transmitter 14 through the input terminal 22, and converts the carrier pulses into the original information signal applied to the transmitter 14 which is sent out through an output 23. The transmission system 11 includes transmitters 24 and 26 and receivers 25 and 27 which are associated to one another and respectively connected to the reference signal and transmission bus lines 13 and 18. The transmission system 11 may further includes some other transmitters and receivers in accordance with the number of time positions of the repeatable sequence, or the reference signal, to be employed to this transmission system.

Figure 2:
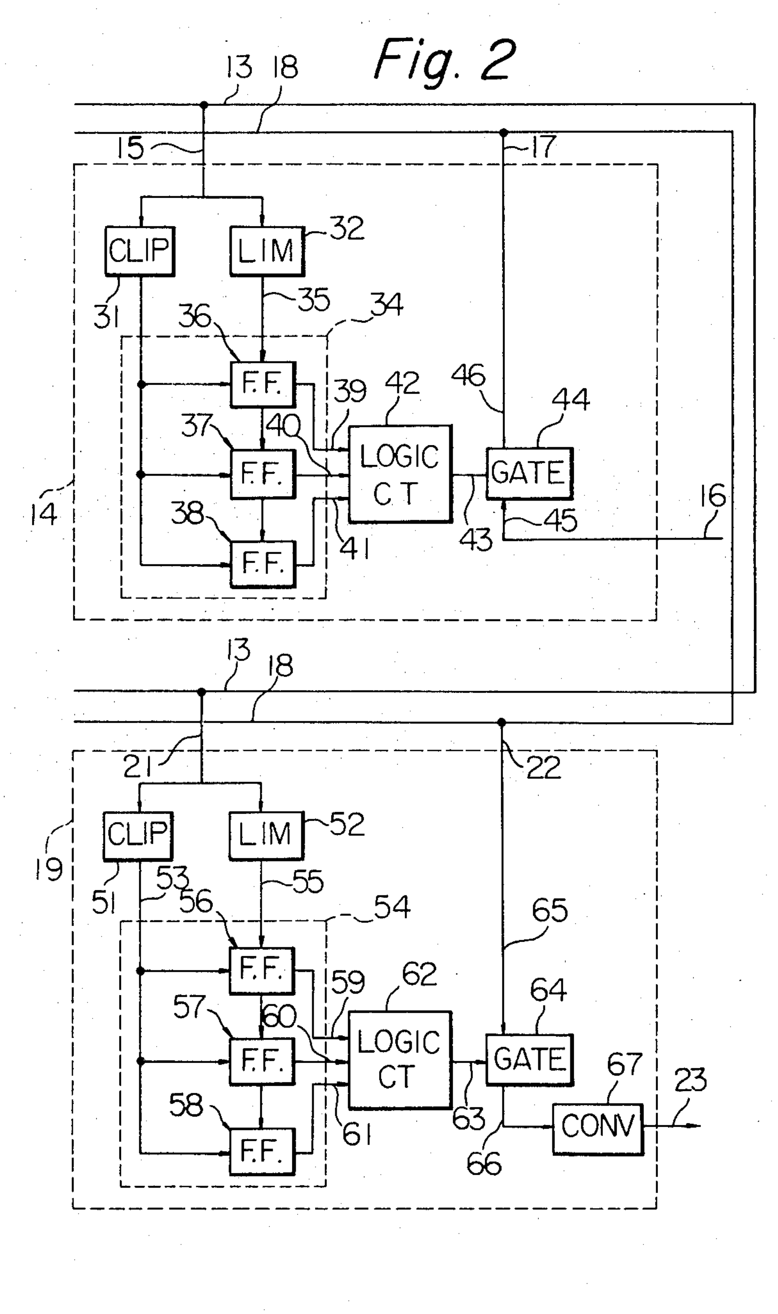
FIG. 2 is a block diagram of the transmitter and receiver of one type used for the multichannel transmission system.

Referring now to FIG. 2, preferred embodiments of the transmitter and the receiver of FIG. 1 are shown, which are usable for this system when a pulse signal shown in FIG. 3(*a*) is employed as the reference signal. This pulse signal consists of pulse sequence including eight clock pulses, of a repetition period T and a synchronizing pulse of a repetition time period T superposed on the first clock pulse. The repeatable pulse sequence may includes a suitable number of clock pulses in accordance with the number of signal channels to be necessitated.

The transmitter and the receiver of FIG. 2 are herein below explained in conjunction with FIG. 3. The generator 12 now produces the reference signal shown in FIG. 3($a$), which is then applied to the reference signal bus line 13. The reference signal on the bus line 13 is applied through the input line 15 to a clipper 31 and a limitter 32. The clipper 31 clips the pulses applied thereto and separates the synchronizing pulses from the reference signal. The thus separated synchronizing pulses are applied to a reset terminal of a counter 34 to thereby reset the counter. The limitter 32 is adapted to limit the pulses sequentially applied thereto to produce uniform clock pulses which is then applied to an input terminal 35 of the counter 34. The counter 34 consists of three flip-flop circuits 36, 37 and 38 connected in series with one another. The counter 34 counts the number of clock pulses from the limitter 32, while it is reset by the synchronizing pulses from the clipper 31. The output terminals from all the stage of the counter 34 are connected to input terminals 39, 40 and 41 of a logical circuit 42 which consists of several logical gate circuits, such as, AND and OR gate. The circuit 42 is adapted to produce an output pulse, that is the carrier pulse, when it receives a predetermined output signal from the counter 34, through the terminals 39, 40 and 41. If, for example, the predetermined output signal is binary logical signal "010", then the output of the logical circuit is pulse train of pulses $C_1$, $C_2$, $C_3$, . . . . shown in FIG. 3($b$). These pulses are sequentially applied through an input terminal 43 of a gate circuit 44. Another input terminal 45 of the gate circuit 44 is connected to the input terminal 16 of this transmitter 14 through which an information signal to be conveyed is applied, which is, for example a positive step signal as shown in FIG. 3($b$) having a rising step at an instant $t_a$ in the basic timing period defined by the synchronizing pulse $s_1$. The gate circuit 44 is adapted to pass therethrough the pulses applied to its input terminal 43 when it receives a positive signal through the input terminal 45, and therefore on the output terminal 46 of the gate 44 appear positive pulses $d_1$, $d_2$, . . . . as shown in FIG. 3($d$). These pulses are sequentially applied through the output line 17 to the transmission line 18.

It should be noted that all the other transmitters of the system are constructed to have the same circuit arrangement except that each has a logic circuit arranged to produce one carrier pulse within a time position corresponding to the signal channel assigned thereto. Therefore a number of carrier pulses occurring within different time positions are applied from those transmitters, to the transmission line as shown in FIG. 3($e$). Although the transmitters are in this case, arranged to produce carrier pulses as long as an information signal is applied thereto, they may be otherwise arranged to produce carrier pulses when no information signal is applied thereto, if desired.

The circuit arrangement of the receiver 19 is, on the other hand, shown in the lower part of FIG. 2, which has a similar construction to the transmitter 14, and includes a clipper 51 and a limitter 52 both connected to the input line 21. The reference signal on the reference signal line 13 is therefore applied to the clipper 51 and the limitter 52. The clipper 51 separates from the reference signal the synchronizing signal which is then applied to a reset terminal 53 of a counter 54. The limitter, on the other hand, separates the clock pulses which are applied to an input terminal 55 of the counter 54. The counter 54 consists of three flip-flop circuits 56, 57 and 58 connected in series which one another. All the reset terminal of the flip-flop circuits 56, 57 and 58 are connected to the reset terminal 53. The counter 54 counts the clock pulses applied through the input terminal 55 while it is reset by every synchronizing pulse. Output terminals of the counter 54 are respectively connected to input terminals 59, 60 and 61 of a logical circuit 62 which may consist of several logical gate circuits such as AND and OR gate. The logical circuit 62 is adapted to produce an output pulse to be used as the gate pulse when the output from the counter 54 is a predetermined value which is equal to the predetermined value with respect to the logical circuit 42 in the transmitter 14. Therefore, the gate pulse appearing on the output of the circuit 62 locates within the same time position as the carrier pulse produced by the logical circuit 42. The gate pulse from the circuit 62 is then applied to an input terminal 63 of a gate circuit 64. Another input terminal 65 is connected to the input line 22. The gate circuit is adapted to pass therethrough the carrier pulses applied through the line 22 when it receives the gate pulses from the logical circuit 62 through the input terminal 63. The carrier pulses passed through the gate circuit 64 are applied to an input terminal 66 of a demodulator 67. The demodulator 67 is adapted to produce a positive or negative signal when it receives the carrier pulse from the gate circuit 64, whereby the carrier pulse is converted into the original information signal applied to the transmitter 14.

This demodulator 67 may be preferably provided with an error checking function for the detection of erroneously transmitted carrier pulse signal.

Figure 4:
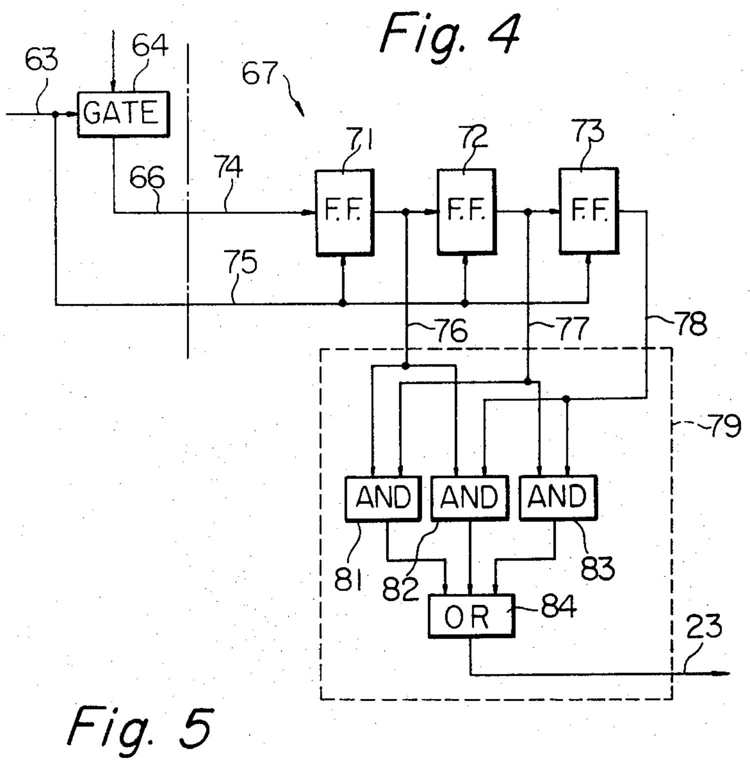
FIG. 4 is a block diagram of an averaging circuit to be used in the receiver of FIG. 2.

FIG. 4 illustrates a preferred example of the demodulator 67 in FIG. 2 provided with such error checking function, which comprises a shift register including first, second and third flip-flop circuits 71, 72 and 73. An input 74 of the shift register is connected to the input of the demodulator 67. A set terminal 75 of the shift register is connected to the output of the logical circuit in parallel with the input 63 of the gate 64. First, second and third output terminals 76, 77 and 78 of the shift register are connected to input terminals of a discriminating circuit 79 which is adapted to produce a positive or negative signal when it receives at least two output signals from the shift register. The discriminating circuit 79, for example, comprises first, second and third AND gate 81, 82 and 83 which respectively have two input terminals connected to two out of three terminals 76, 77 and 78. Output terminals of the AND gate are connected to input terminals of an OR gate 84 having an output terminal serving as the output of the circuit 67. The thus constructed demodulating and error checking circuit 67 neglects the erroneous decay of one of three carrier pulses as above mentioned whereby the receiver hardly affected by rarely occurring external disturbance or noise.

Figure 5:
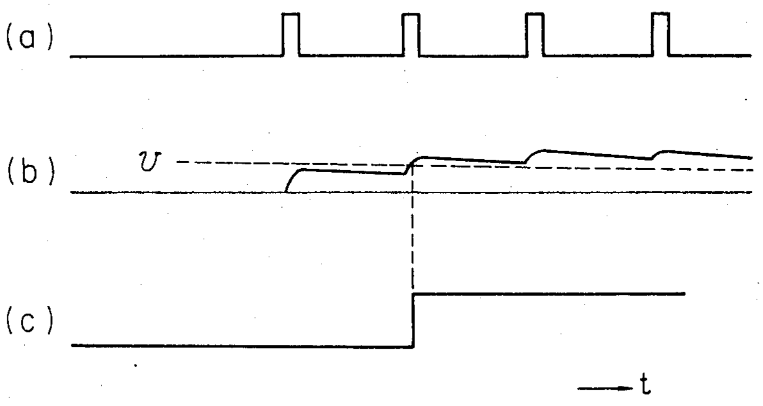
FIG. 5 illustrates wave-forms in another an averaging circuit to be used in the receiver of FIG. 2.

The circuit above-mentioned may be an analogue circuit arrangement including an integrator and a discriminator. In this case, when the integrator receives the carrier pulses as shown in FIG. 5($a$), it produces on output signal having a voltage varying as shown in FIG. 5($b$). When the voltage of the output signal exceeds a threshold value $v$, the discriminator produces on output signal as shown in FIG. 5(*c*).

It may be readily understood that various averaging circuits may be used for the particular demodulating and error checking circuit.

Figure 6:
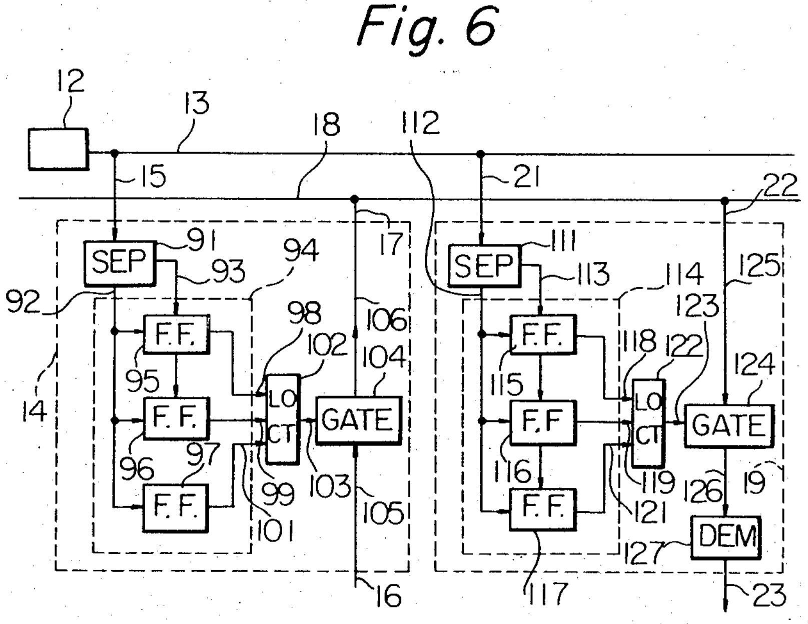
FIG. 6 is a block diagram of the transmitter and receiver of another type used for the transmission system.
Figure 7:
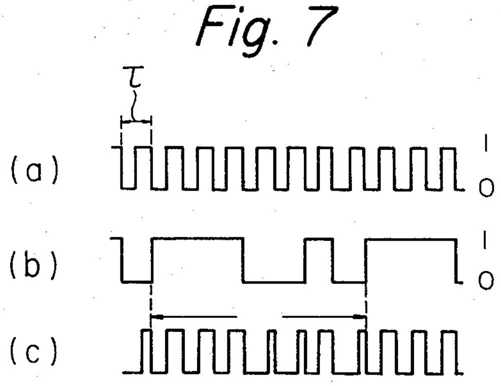
FIG. 7 illustrates wave-forms for the purpose of the description of the repeatable pulse sequence to be employed in the transmission system.

Referring to FIG. 6, another preferred embodiment of the transmission system of this invention is shown, wherein the generator 12 is adapted to produce as a reference signal another form of repeated pulse sequence constituted by clock pulses modulated by an M-sequence signal. The generator 12 first produces a uniform clock pulse train having a repetition period and an M-sequence signal having time period T as shown in FIGS. 7(*a*) and (*b*), respectively. The M-sequence signal is 4th-order one which is constituted by pulses respectively representing logical "0" and "1". This M-sequence signal is combined with the clock pulse train so as to modulate in width the clock pulse train as shown in FIG. 7(*c*). The modulated clock pulse train has pulses having smaller pulse width representing the logical "0" and larger pulse width representing the logical "1". Thus modulated pulse train is transmitted through the reference signal line 13 to all the transmitters and the receivers of the system. For the simplicity of the explanation, the circut arrangements of the transmitters and the receivers are described hereinbelow with respect to the transmitter 14 and the receiver 19. The transmitter 14 comprises a separator 91 connected to the reference signal line 13 through the input line 15 so as to receive the repeated pulse sequence from the generator 12. The separator 91 divides the reference signal into the clock pulses and the M-sequence signal which are applied to input terminals 92 and 93 of a shift register 94. The shift register includes first, second and third flip-flop circuits 95, 96 and 97. The output terminals of the shift register are respectively connected to input terminals 98, 99 and 101 of a logical circuit 102. The logical circuit is, for example, adapted to produce a carrier pulse on its an output terminal when it receive logical "1" signals through the input terminals 98 and 99 and logical "0" signal through the terminal 101. The output terminal of the logic circuit 102 is connected to an input terminal 103 of a gate 104. To another input terminal 105 is connected to the input terminal 16 through which an information signal to be conveyed is applied. An output terminal 106 is connected to the transmission line 18 through the output line 17.

Figures 8, 9:
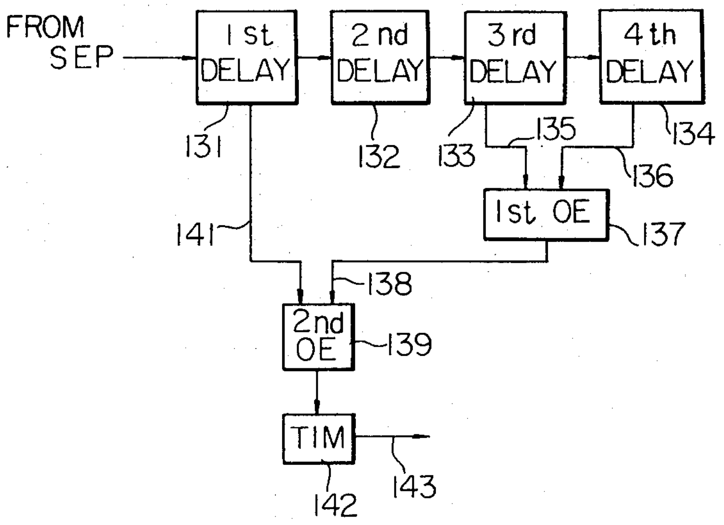
FIG. 8 is a diagram showing the manner of the production of the carrier pulse.
FIG. 9 is a block diagram of an error detection to be used in the receiver of FIG. 6.

In operation, the shift-register 94 produces on its output terminals M-sequence signals which are delayed t, 2t and 3t, respectively representing such sequential logical digits as shown in columns D1, D2, and D3 of FIG. 8. Receiving such M-sequence signal, the logic circuit 102 produces carrier pulse train representing logical sequential digits shown in column X of FIG. 8. The gate 104 passes therethrough the carrier pulse train from the logical circuit 102 as long as the gate 104 receives the information signal through the input terminal 105.

In this instance, it should be noted that in the sequential digits of column X, digit "1" appears at only one of seven time positions which is assigned to this transmitter as a signal channel.

The receiver 19, on the other hand, have generally the same construction as the transmitter and comprises a separator 111 connected to the reference signal line 13 through the input line 21 so as to receive the reference signal of the repeated pulse sequence from the generator 12. The separator 111 divides the reference signal into the clock pulses and the M-sequence signal which are applied to input terminals 112 and 113 of a shift register 114. The shift register comprises first, second and third flip-flop circuit 115, 116 and 117. The output terminals of the shift register 114 are respectively connected to input terminals of a logical circuit 122. The logical circuit 122 is arranged identically to the logical circuit 102 of the transmitter 14. An output terminal of the logical circuit 122 is connected to an input terminal 123 of a gate 124 which is identical to the gate 104. To another input terminal 125 of the gate 124 is connected to the input terminal 22 of the transmitter 19. An output terminal of the gate 124 is connected to an input terminal 126 of a demodulator 127 which is adapted to produce on its output terminal a positive or negative signal. The output terminal of the demodulator 127 is connected to the output terminal 23.

In operation, the shift register 114 produces on its output terminals M-sequence signal which are the same as the M-sequence signals produced by the shift register 94 of the transmitter 14. Therefore, the logical circuit 122 produces on its output terminal a gate pulse train which identical to the carrier pulse train produced by the logical circuit 102. When an information signal is applied through the input terminal 16 of the transmitter 14, the carrier pulse train is applied through the transmission line 18 and the input terminal 22 of the receiver 19 to the gate 124. Since the gate pulse train is now applied to the input terminal 123, the carrier pulses transmitted passed through the gee 124 and applied to the demodulator 127. The demodulator 127 produces on the output terminal 23 a positive or negative signal which is representing the information signal applied to the transmitter 14. As a result, the information signal applied to the transmitter 14 is transmitted to the output terminal 23 of the receiver 19.

It should be understood that the demodulator 127 may be the same as the demodulating and error checking circuit 67 shown in FIG. 2.

The receiver of FIG. 6 may preferably further includes a circuit for checking the M-sequence signal in order to prevent the erroneous operating of the system, which circuit is shown in FIG. 9. The checking circuit comprises first, second, third and fourth delaying circuits 131, 132, 133 and 134 each having a delay time equal to the time period t of the clock pulse train. An input terminal of the delaying circuit 131 is to be connected to the separator 111 of the receiver. Output terminals are connected to input terminals of a first exclusive OR circuit 137. An output of the circuit 137 is connected one input terminal 138 of a second exclusive OR circuit 139. The other input terminal 141 of the circuit 139 is connected to the output terminal of the first delay circuit 131. An output terminal is connected to a input terminal of a timing circuit 142 which produces on its output terminal 143 a disabling signal for disabling the gate 124 for a suitable duration, when it receives a logical "1" signal from the second exclusive OR circuit 139.

It is understood from FIG. 8 that a logical value at a certain timing position of the 3th-order M-sequence is equal to a value introduced by coupling, under the exclusive OR logic, logical value at time positions former by 2 t and 3t, respectively. Therefore, when the 3th-order M-sequence signal is applied to the input terminal of the first delaying circuit 131, signals on the input terminals 141 and 138 are always equal to each other as long as the M-sequence signal is in order. However, when the M-sequence signal distributed by external noise to be out of order, the signals on the input terminals 141 and 138 are difference to each other with the result that the second exclusive OR circuit 139 produces on its output terminal logical "1" signal. The logical "1" signal is applied to the timing circuit 142 which then produces a disabling signal on the output terminal 143. The disabling signal is applied to the gate 124 which then stops the receiving signal from the transmission line. The disabling signal should be continuously produced for a suitable duration which is, for example, N times as long as the repetition time period t in the case of the Nth-order M-sequence signal. In this instance, the timing circuit may be a counter counting the clock pulses.

In addition, the flip-flop circuits 115, 116 and 117 may be used for the first, second and third delaying circuit 131, 132 and 137, if desired.

Obviously many modifications and variations of the present invention are possible in the light of the above teachings. It is therefore to be understood that within the scope of the appended claims the invention may be practiced otherwise than as specifically described.

What is claimed is:

1. A time division multichannel transmission system, which comprises:

at least one generator for producing a clock pulse train modulated by an M-sequence signal and for applying said clock pulse train to a reference signal bus line;

a plurality of transmitters connected to said reference signal and transmission bus lines and including first delaying means for delaying said M-sequence signal so as to produce a plurality of first delayed replicas of said M-sequence signal which are delayed from one another by the repetition period of said clock pulse train, a first logical circuit means for producing carrier pulses each appearing within a time slot assigned to a distinct signal channel by combining said first delayed replicas, and modulating means for modulating in amplitude said carrier pulses with a given information signal and for sending out the modulated carrier pulses to said transmission line; and a plurality of receivers connected to said reference signal and transmission bus lines and including a second separating means connected to said reference signal bus line for separating said M-sequence signal from said clock pulse train, second delaying means for delaying said M-sequence signal so as to produce a plurality of second delayed replicas of said M-sequence signal which are delayed from one another by the repetition period of said clock pulse train, a second logical circuit means for producing gate pulses each appearing within said time slot by combining said delayed replicas, gate means connected to said transmission line for passing therethrough said carrier pulse during the pulse width of said gate pulse, and demodulating means for demodulating the passed carrier pulse into said information signal.

2. A time division multichannel transmission system according to claim 1, in which each of said first and second delaying means is a shift register.

3. A time division multichannel transmission system according to claim 1, in which said demodulator includes an averaging circuit for averaging the carrier pulses passed through said gate means and a discriminating circuit for producing an output when the average of said carrier pulses exceeds a preselected value, whereby said demodulator neglects erroneous decay of one of three carrier pulses.

4. A time division multichannel transmission system according to claim 1, which further comprises an M-sequence signal checking circuit for checking 3-th order M-sequence signal, said M-sequence signal checking circuit comprises first, second, third and fourth delaying circuits connected in series to one another in the order named and each having a delay time equal to the repetition period of said clock pulse train, a first exclusive OR gate having its inputs connected to said third and fourth delay circuits, a second exclusive OR gate having its input connected to said first delaying circuit and output of said first exclusive OR gate, and timing circuit for producing a signal in accordance with an output signal from said second exclusive OR gate.

5. A time division multichannel transmission system according to claim 4, in which said timing circuit includs a counter adapted to count the clock pulses and to produce said output signal in accordance with the number of counted clock pulses.

* * * * *